United States Patent
Kwak

(10) Patent No.: US 7,424,033 B2
(45) Date of Patent: Sep. 9, 2008

(54) NETWORK ADDRESS TRANSLATION ROUTER FOR VOICE INTERNET PROTOCOL SYSTEM

(75) Inventor: Jae-Yong Kwak, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1064 days.

(21) Appl. No.: 10/215,035

(22) Filed: Aug. 9, 2002

(65) Prior Publication Data

US 2004/0028028 A1    Feb. 12, 2004

(51) Int. Cl.
*H04J 3/16* (2006.01)
(52) U.S. Cl. .................. 370/466; 370/352; 370/401
(58) Field of Classification Search .................. None
See application file for complete search history.

(56) References Cited

U.S. PATENT DOCUMENTS

| 6,549,886 B1* | 4/2003 | Partalo ................. 704/270.1 |
| 7,068,684 B1* | 6/2006 | Suder et al. ............. 370/493 |
| 2001/0004361 A1* | 6/2001 | Kobayashi ............... 370/401 |
| 2001/0030950 A1 | 10/2001 | Chen et al. |
| 2001/0043571 A1 | 11/2001 | Jang et al. |
| 2003/0076830 A1* | 4/2003 | Asano .................. 370/392 |
| 2003/0093563 A1* | 5/2003 | Young et al. ............ 709/245 |
| 2003/0233576 A1* | 12/2003 | Maufer et al. ........... 713/201 |

OTHER PUBLICATIONS

Bur Goode, "*Voice Over Internet Protocol (VoIP)*," IEEE, vol. 90, No. 9, pp. 1495-1517, Sep. 2002.

* cited by examiner

*Primary Examiner*—Chi H. Pham
*Assistant Examiner*—Phuc Tran
(74) *Attorney, Agent, or Firm*—Robert E. Bushnell, Esq.

(57) ABSTRACT

A network address translation (NAT) router for connecting an inside network to an outside network. The inside network uses local addresses and has a plurality of voice over Internet protocol (VoIP) systems and a plurality of hosts, and the outside network uses global addresses. An Ethernet driver is connected to Ethernet drivers in the voice over Internet protocol systems by a hub. An Ethernet and Internet protocol (IP) interface module assigns predetermined physical addresses to the Ethernet drivers of the voice over Internet protocol systems. A transmission control protocol/Internet protocol (TCP/IP) module is connected to the Ethernet and Internet protocol interface module and sets a predetermined number of local Internet protocol addresses for the voice over Internet protocol systems. A network address translation module translates an inside local Internet protocol address within a voice over Internet protocol system to a global Internet protocol address.

21 Claims, 3 Drawing Sheets

NETWORK ADDRESS TRANSLATION ROUTER FOR VOICE INTERNET PROTOCOL SYSTEM

BACKGROUND OF THE INVENTION

1. Technical Field

The present invention relates generally to a voice over Internet protocol (VoIP) system, and in particular, to a voice over Internet protocol system that assigns addresses through network address translation.

2. Related Art

Voice over Internet protocol (VoIP) is a novel communications service that provides a voice call not over the public switched telephone network (PSTN) but over the Internet. Due to the use of a packet-based network, domestic/international calls can be made free of charge by deploying voice over Internet protocol. Voice over Internet protocol can even deliver video information as well as audio information using the ITU-T H.323 protocol.

A voice over Internet protocol (VoIP) system includes the Internet as a backbone. Gateways and personal computers (PCs) are connected to the Internet. The gateways are connected to public switched telephone networks that are in turn connected to telephones. The telephones and the personal computers are endpoints that are capable of carrying out communications by voice (mandatory), moving pictures (optional), and data (optional) in one-to-one communications or video conferencing. These terminals can carry out real-time bi-directional communications with the gateways or other terminals. The gateways enable real-time bi-directional communications between terminals (e.g., personal computers) connected to the Internet (that is, the packet-based network) and terminals (e.g., telephones) connected to the public switched telephone networks or an integrated services digital network (ISDN).

The voice over Internet protocol system must use a unique Internet protocol (IP) address to communicate over the Internet. However, permanent assignment of unique Internet protocol addresses for connection to the global Internet results in a shortage of available unique Internet protocol addresses.

To solve the above problem, network address translation (NAT) is used. Network address translation is a technology which allows all of the hosts on a private network to access the Internet via a single public Internet protocol address by translating a plurality of temporary inside addresses to the public Internet protocol address. The resulting avoidance of collisions with outside Internet protocol addresses enables use of more inside Internet protocol addresses than regulated.

In such a network, transmission control protocol/Internet protocol (TCP/IP)-based data coexists with voice over Internet protocol (VoIP)-based voice. Despite use of the same transmission control protocol/internet protocol network layer, network address translation does not support existing protocols used for general data for the voice over Internet protocol. Moreover, most networks provide control only to general data internally, and exclude voice data. Since the voice over Internet protocol system can access the Internet by a unique Internet protocol address only, as compared to general private network systems, Internet protocol efficiency of the voice over Internet protocol system is low.

The following patents are considered to be generally pertinent to the present invention but are burdened by the disadvantages set forth above: U.S. Patent Publication No. 2001/0043571A1 to Jang et al., entitled MULTIPLE SUBSCRIBER VIDEOCONFERENCING SYSTEM, published on Nov. 22, 2001; U.S. Patent Publication No. 2001/0004361 A1 to Kobayashi, entitled TELEPHONE CONTROLLER FOR VOIP, published on Jun. 21, 2001; and U.S. Patent Publication No. 2001/0030950 A1 to Chen et al., entitled BROADBAND COMMUNICATIONS ACCESS DEVICE, published on Oct. 18, 2001.

SUMMARY OF THE INVENTION

It is, therefore, an object of the present invention to provide a system for maximizing voice over Internet protocol efficiency by applying a net protocol to a voice over Internet protocol system.

To achieve the above and other objects, there is provided a network address translation (NAT) router for connecting an inside network to an outside network. The inside network uses local addresses and has a plurality of voice over Internet protocol (VoIP) systems and a plurality of hosts, while the outside network uses global addresses. An Ethernet driver is connected to other Ethernet drivers in the voice over Internet protocol systems by a hub. An Ethernet and Internet protocol interface module assigns predetermined physical addresses to the Ethernet drivers of the voice over Internet protocol systems. A transmission control protocol/internet protocol module is connected to the Ethernet and Internet protocol interface module, and sets a predetermined number of local Internet protocol addresses for the voice over Internet protocol systems, while a network address translation module translates an inside local Internet protocol address within the voice over Internet protocol system to a global Internet protocol address.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described below with reference to the accompanying drawings. In the following description, well-known functions or constructions are not described in detail since they would obscure the invention in unnecessary detail.

Figure 1:
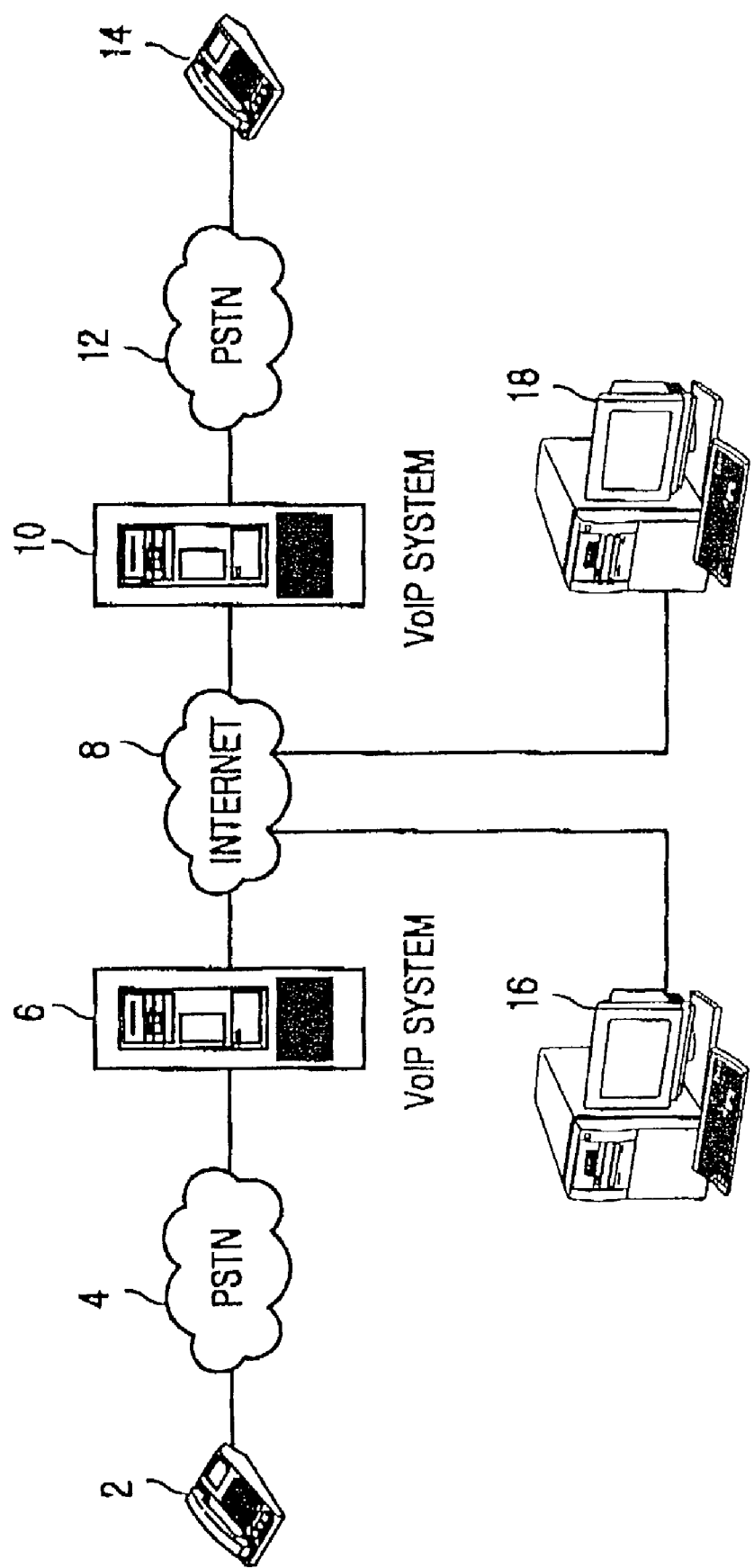
FIG. 1 is a schematic view illustrating the configuration of a typical voice over Internet protocol (VoIP) system.

FIG. 1 illustrates a voice over Internet protocol (VoIP) system using the Internet as a backbone. Referring to FIG. 1, the voice over Internet protocol system includes the Internet 8 as a backbone. Gateways 6 and 10 and personal computers (PCs) 16 and 18 are connected to the Internet 8. The gateways 6 and 10 are connected to public switched telephone networks 4 and 12, respectively, which in turn are connected to telephones 2 and 14, respectively. The telephones 2 and 14 and the personal computers 16 and 18 are endpoints that are capable of carrying out communications by voice (mandatory), moving pictures (optional), and data (optional) in one-to-one communications or video conferencing. These terminals can carry out real-time bi-directional communications with the gateways 6 and 10 or other terminals. The gateways 6 and 10 enable real-time bi-directional communications between terminals (e.g., the personal computers 16 and 18) connected to the Internet 8 (that is, the packet-based network) and terminals (e.g., the telephones 2 and 14) connected to the public switched telephone networks 4 and 12 or an integrated services digital network (ISDN).

The voice over Internet protocol system illustrated in FIG. 1 must use a unique Internet protocol (IP) address to communicate over the Internet. However, permanent assignment of unique Internet protocol addresses for connection to the global Internet results in a shortage of available unique Internet protocol addresses.

Figure 2:
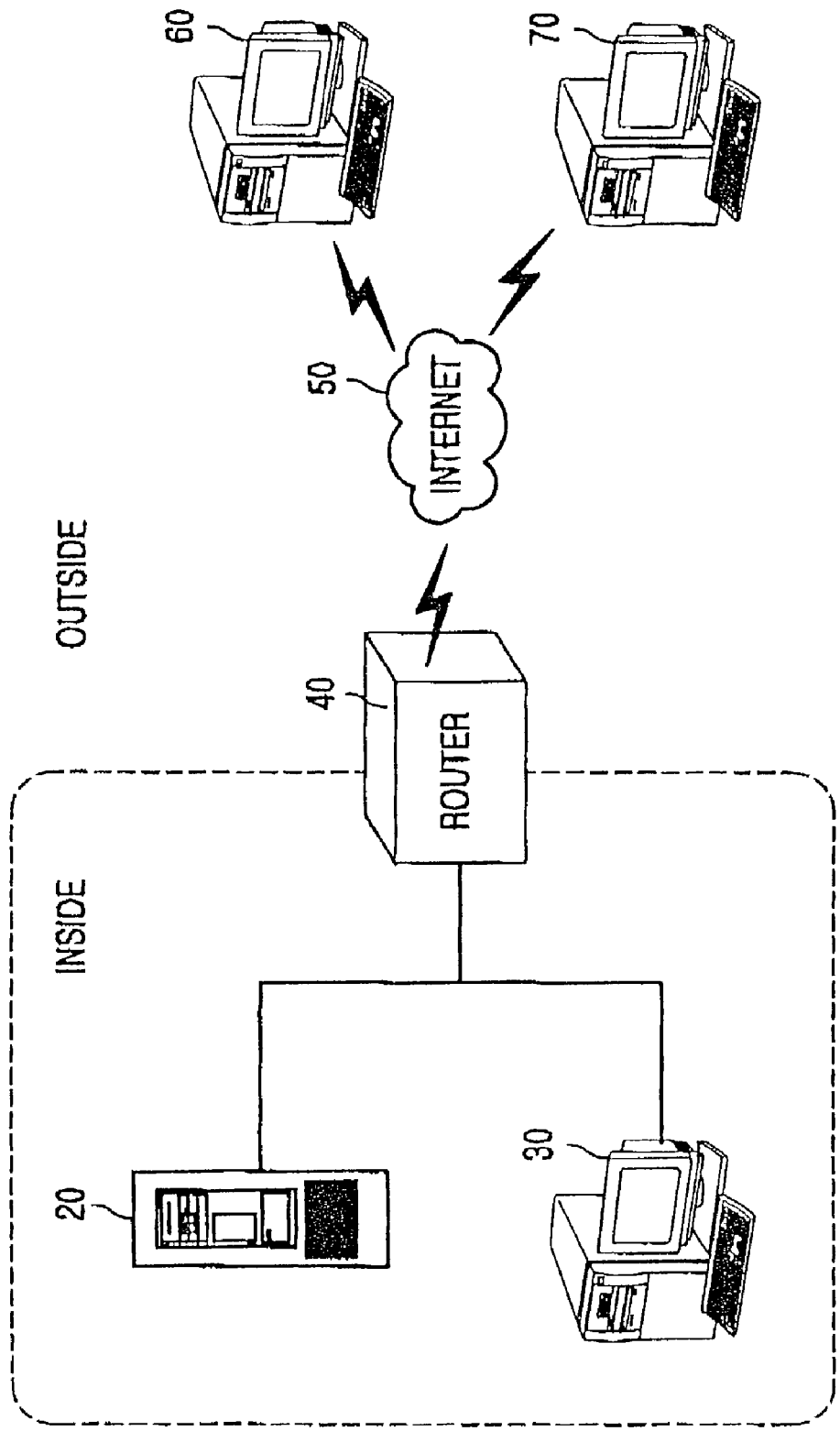
FIG. 2 is a schematic view illustrating the configuration of a network using network address translation (NAT) for voice over Internet protocol (VoIP) according to the present invention.

Referring to FIG. 2, the term "inside" denotes a private network for which Internet access is allowed by address translation, and the term "outside" denotes an external network, usually the Internet. A voice over Internet protocol system 20 and a personal computer 30 are connected to a router 40, which is connected to the Internet 50, and personal computers 60 and 70 are also connected to the Internet 50. Network address translation can be set only in a router that connects two networks. The voice over Internet protocol (VoIP) system 20 and the personal computer 30 use private addresses or invalid Internet protocol (IP) addresses. They can transmit packets to the Internet 50 only if the private addresses are translated to public Internet protocol addresses. The address translation interacts with routing by setting network address translation (NAT) in the router 40 at an intended location. Network address translation is implemented using routing tables in which private Internet protocol addresses are mapped to public Internet protocol addresses. In general, each routing table has network addresses, sub-net addresses, or the Internet protocol addresses of devices.

The router 40 has typical network address translation router functionalities, that is, fixed address translation, dynamic source address translation, dynamic port translation, and destination address rotary translation. An internal local address is mapped to a global address on a one-to-one basis by fixed address translation. By means of dynamic source address translation, an internal local address can be dynamically mapped to a global address.

Dynamic port translation is carried out using a transmission control protocol (TCP)/user datagram protocol (UDP) source port to conserve addresses in an address pool. Even though a plurality of local addresses is mapped to a single global address, port numbers can be discriminated. Destination address rotary translation allows particular traffic to be carried from the outside to the inside.

The router 40 sets a desired number of voice over Internet protocol (VoIP) local Internet protocol addresses for the voice over Internet protocol system 20. Then, the router 40 assigns a particular Internet protocol address to voice over Internet protocol, and allows Internet access by translating the Internet protocol address to the global Internet protocol address.

Figure 3:
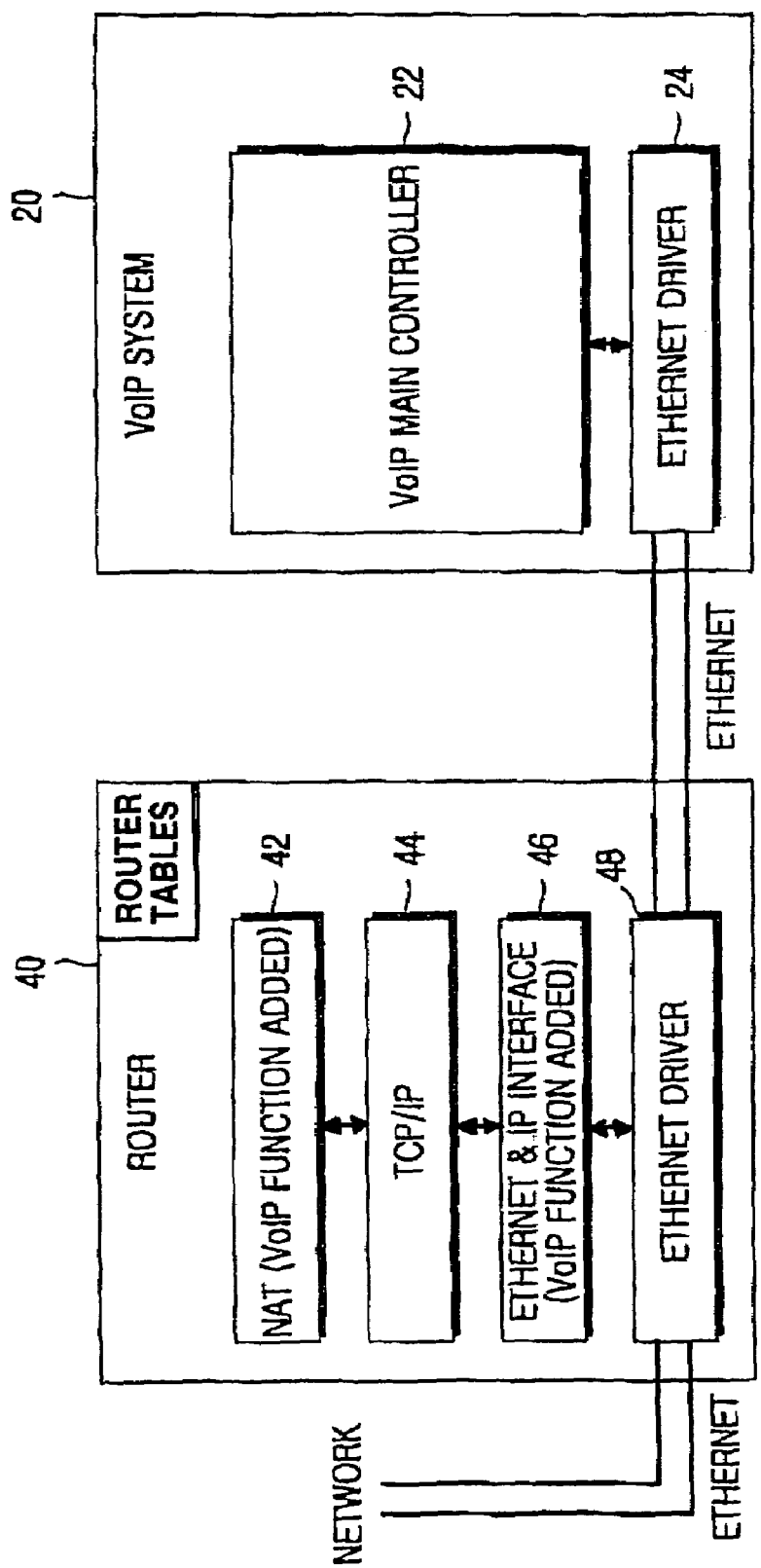
FIG. 3 is a block diagram of the voice over Internet protocol (VoIP) system and the router illustrated in FIG. 2 according to the present invention.

FIG. 3 is a block diagram of the voice over Internet protocol (VoIP) system 20 and the router 40 illustrated in FIG. 2. Referring to FIG. 3, outgoing Internet protocol (IP) packets related to voice over Internet protocol pass through the router 40, and incoming voice over Internet protocol packets also pass through the router 40 so as to reach a voice over Internet protocol main controller 22. An Ethernet driver 24 in the voice over Internet protocol system 20 is operated in conjunction with an Ethernet driver 48 in the router 40 by means of a hub (not shown). The hub is a device that connects equipment at an office to equipment located a short distance away in a local area network (LAN). In general, the hub performs network connection with computers or printers, connection to another network (or another hub) located a short distance away, and connection to a network device such as a router, network status checker, and signal amplification unit. The Ethernet driver 24 can be used independently in the voice over Internet protocol system 20, or in connection with the router 40. The Ethernet driver has a medium access control (MAC) address for physical connection to a network. In the present invention, a predetermined medium access control address is assigned to voice over Internet protocol.

A particular Ethernet port number received from the Ethernet is delivered from an Ethernet and Internet protocol (IP) interface module 46 directly to a transmission control protocol/Internet protocol (TCP/IP) module 44. The transmission control protocol/Internet protocol module 44 assigns a local address set by a user to voice over Internet protocol (VoIP) using conventional network address translation (NAT), or sets a desired number of voice over Internet protocol local Internet protocol addresses.

A network address translation module 42 transmits data to personal computers and network devices by translating a global Internet protocol address to local Internet protocol addresses. Thus, the network address translation module 42 can use up to 255 local Internet protocol addresses. The network address translation module 42 assigns a particular Internet protocol address to voice over Internet protocol (VoIP), and transmits voice data without any limitations. That is, the network address translation module 42 can translate an inside local Internet protocol address in the voice over Internet protocol system 20 to an outside global Internet protocol address. When voice and data are transmitted 3:1, voice efficiency is increased in the present invention.

In accordance with the present invention, the cost associated with Internet protocol address assignment is reduced and voice packets are processed with high efficiency by applying an NET protocol to voice over Internet protocol (VoIP). Therefore, a stable network system can be realized. In particular, operation of a plurality of voice over Internet protocol systems can maximize cost reduction.

Although a preferred embodiment of the present invention has been described, it will be understood by those skilled in the art that the present invention should not be limited to the described preferred embodiment. Rather, various changes and modifications can be made within the spirit and scope of the present invention, as defined by the following claims.

What is claimed is:

1. A network address translation (NAT) router for connecting an inside network that uses local addresses and has a plurality of voice over Internet protocol (VoIP) systems and a plurality of hosts to an outside network that uses global addresses, comprising:

an Ethernet and Internet protocol (IP) interface module for assigning predetermined physical addresses to Ethernet drivers of the voice over Internet protocol systems;

a transmission control protocol/Internet protocol (TCP/IP) module connected to the Ethernet and Internet protocol interface module for setting a predetermined number of local Internet protocol addresses for the voice over Internet protocol systems; and a network address translation (NAT) module for translating an inside local Internet protocol address within one of the voice over Internet protocol systems to a global Internet protocol address.

2. The network address translation router of claim 1, further comprising an Ethernet driver connected to the Ethernet drivers of the voice over Internet protocol systems.

3. The network address translation router of claim 2, wherein the network address translation module has a routing table that lists the physical addresses and the inside local Internet protocol addresses of the voice over Internet protocol systems.

4. The network address translation router of claim 3, wherein the transmission control protocol/Internet protocol (TCP/IP) module assigns the local Internet protocol addresses to the voice over Internet protocol systems so that voice transmission is carried out freely.

5. The network address translation router of claim 4, wherein the Ethernet and Internet protocol (IP) interface module delivers an Ethernet port number to the transmission control protocol/Internet protocol (TCP/IP) module.

6. The network address translation router of claim 3, wherein the Ethernet and Internet protocol (IP) interface module delivers an Ethernet port number to the transmission control protocol/Internet protocol (TCP/IP) module.

7. The network address translation router of claim 2, wherein the transmission control protocol/Internet protocol (TCP/IP) module assigns the local Internet protocol addresses to the voice over Internet protocol systems so that voice transmission is carried out freely.

8. The network address translation router of claim 7, wherein the Ethernet and Internet protocol (IP) interface module delivers an Ethernet port number to the transmission control protocol/Internet protocol (TCP/IP) module.

9. The network address translation router of claim 2, wherein the Ethernet and Internet protocol (IP) interface module delivers an Ethernet port number to the transmission control protocol/Internet protocol (TCP/IP) module.

10. The network address translation router of claim 1, wherein the network address translation module has a routing table that lists the physical addresses and the inside local Internet protocol addresses of the voice over Internet protocol systems.

11. The network address translation router of claim 10, wherein the transmission control protocol/Internet protocol module assigns the local Internet protocol addresses to the voice over Internet protocol systems so that voice transmission is carried out freely.

12. The network address translation router of claim 11, wherein the Ethernet and Internet protocol interface module delivers an Ethernet port number to the transmission control protocol/Internet protocol module.

13. The network address translation router of claim 10, wherein the Ethernet and Internet protocol interface module delivers an Ethernet port number to the transmission control protocol/Internet protocol module.

14. The network address translation router of claim 1, wherein the transmission control protocol/Internet protocol module assigns the local Internet protocol addresses to the voice over Internet protocol systems so that voice transmission is carried out freely.

15. The network address translation router of claim 14, wherein the Ethernet and Internet protocol interface module delivers an Ethernet port number to the transmission control protocol/Internet protocol module.

16. The network address translation router of claim 1, wherein the Ethernet and Internet protocol interface module delivers an Ethernet port number to the transmission control protocol/Internet protocol module.

17. A network address translation router for connecting an inside network that uses local addresses and has a plurality of voice over Internet protocol systems and a plurality of hosts to an outside network that uses global addresses, comprising:
   an Ethernet and Internet protocol interface module for assigning predetermined physical addresses to Ethernet drivers of the voice over Internet protocol systems;
   a transmission control protocol/Internet protocol module connected to the Ethernet and Internet protocol interface module for assigning local Internet protocol addresses to the voice over Internet protocol systems so that voice transmission is carried out freely; and
   a network address translation module for translating an inside local Internet protocol address within one of the voice over Internet protocol systems to a global Internet protocol address.

18. The network address translation router of claim 17, further comprising an Ethernet driver connected to the Ethernet drivers of the voice over Internet protocol systems.

19. The network address translation router of claim 18, wherein the Ethernet and Internet protocol (IP) interface module assigns the predetermined physical addresses to the Ethernet drivers of the voice over Internet protocol (VoIP) systems.

20. The network address translation router of claim 17, wherein the network address translation module has a routing table that lists the physical addresses and the inside local Internet protocol addresses of the voice over Internet protocol systems.

21. The network address translation router of claim 17, wherein the Ethernet and Internet protocol (IP) interface module delivers an Ethernet port number to the transmission control protocol/Internet protocol (TCP/IP) module.

* * * * *